(12) United States Patent
Holt et al.

(10) Patent No.: US 10,139,217 B1
(45) Date of Patent: Nov. 27, 2018

(54) ARRAY BASED PATTERNED ILLUMINATION PROJECTOR

(71) Applicant: Google LLC, Mountain View, CA (US)

(72) Inventors: Jason Holt, Mountain View, CA (US);
Roman Lewkow, San Jose, CA (US);
Sameer Ansari, San Francisco, CA (US)

(73) Assignee: Google LLC, Mountain View, CA (US)

( * ) Notice: Subject to any disclaimer, the term of this patent is extended or adjusted under 35 U.S.C. 154(b) by 81 days.

(21) Appl. No.: 15/045,056

(22) Filed: Feb. 16, 2016

(51) Int. Cl.
*G01N 21/00* (2006.01)
*G02B 23/26* (2006.01)
*G01B 11/00* (2006.01)
*F21V 5/04* (2006.01)
*F21V 7/04* (2006.01)
*F21Y 101/02* (2006.01)

(52) U.S. Cl.
CPC ............ *G01B 11/002* (2013.01); *F21V 5/043* (2013.01); *F21V 7/043* (2013.01); *F21Y 2101/02* (2013.01); *F21Y 2101/025* (2013.01)

(58) Field of Classification Search
None
See application file for complete search history.

(56) References Cited

U.S. PATENT DOCUMENTS

| | | | | |
|---|---|---|---|---|
| 4,175,862 A * | 11/1979 | DiMatteo | ............. | G01B 11/245 356/610 |
| 4,954,962 A * | 9/1990 | Evans, Jr. | ............. | G01C 21/00 180/169 |
| 5,023,943 A * | 6/1991 | Heberle | ................ | G06F 3/0308 398/131 |
| 5,691,784 A * | 11/1997 | Hausler | ............. | G01B 11/2536 349/1 |
| 6,377,353 B1 * | 4/2002 | Ellis | ..................... | A01K 11/006 348/135 |
| 7,068,444 B2 * | 6/2006 | Nishi | ..................... | G02B 13/06 345/7 |

(Continued)

OTHER PUBLICATIONS

Herrnsdorf, J. et al, "Concept of a GaN-LED-based positioning system using structured illumination", https://ieeexplore.ieee.org/stamp/stamp.jsp?arnumber=7323475.*

(Continued)

*Primary Examiner* — Shawn Decenzo
*Assistant Examiner* — Jarreas C Underwood
(74) *Attorney, Agent, or Firm* — McDonnell Boehnen Hulbert & Berghoff LLP

(57) ABSTRACT

A light emitter is provided to emit, into an environment of interest, a plurality of different patterns of light during respective periods of time. Each of the different patterns of light varies according to angle in a first direction such the location of a light detector disposed in the environment can be determined based on illumination from the light emitter that is detected by the light detector over time. The light emitter includes an astigmatic optical element and a die on which are disposed multiple sets of one or more light emitters, each set corresponding to a respective pattern of illumination emitted from the light emitter. Such a configuration of the light emitter can provide means for producing the different patterns of illumination in an energy-efficient, low-cost, and/or size-constrained manner.

20 Claims, 6 Drawing Sheets

(56) References Cited

U.S. PATENT DOCUMENTS

| | | | | |
|---|---|---|---|---|
| 7,168,837 | B2* | 1/2007 | Ishida | H01L 25/0753 |
| | | | | 362/539 |
| 7,352,011 | B2* | 4/2008 | Smits | H01L 33/54 |
| | | | | 257/100 |
| 7,993,035 | B2* | 8/2011 | Shih | G02B 19/0028 |
| | | | | 362/311.02 |
| 8,011,811 | B2* | 9/2011 | Shih | F21V 5/04 |
| | | | | 362/311.02 |
| 8,167,462 | B2* | 5/2012 | Kim | F21S 8/08 |
| | | | | 362/311.02 |
| 8,338,841 | B2* | 12/2012 | Lerman | H01L 25/0753 |
| | | | | 257/88 |
| 8,493,496 | B2* | 7/2013 | Freedman | G06K 9/2036 |
| | | | | 348/340 |
| 8,675,077 | B2* | 3/2014 | Hill | H04N 5/2253 |
| | | | | 348/187 |
| 9,513,113 | B2* | 12/2016 | Yang | A61B 90/35 |

OTHER PUBLICATIONS

Nakazawa, A., et al., "Point of Gaze Estimation through Corneal Surface Reflection in an Active Illumination Environment," http://www.ime.cmc.osaka-u.ac.jp/~nakazawa/wiki/index.php?EGT, p. 1-14.

Xia, R., et al. "Lumitrack: Low Cost, High Precision, High Speed Tracking with Projected m-Sequences," Human-Computer Interaction Institute. (2013).

Tian, L., et al., "Multiplexed coded illumination for Fourier Ptychography with an LED array microscope," Optical Society of America (2014).

Herrnsdorf, J., et al., "Concept of a GaN-LED-based positioning system using structured ilumination," https://pure.strath.ac.uk/portal/files/44763693/Herrnsdorf_etal_IPC2015_concept_GaN_LED_based_postioning_system_using_structured_illumination.pdf.

Raskar, R., et al., Prakash Lighting Aware Motion Capture using Photosensing Markers on Multiplexed Illuminators, ACM Transactions on Graphics, vol. 26, No. 3, Article 36, p. 1-11 (2007).

* cited by examiner

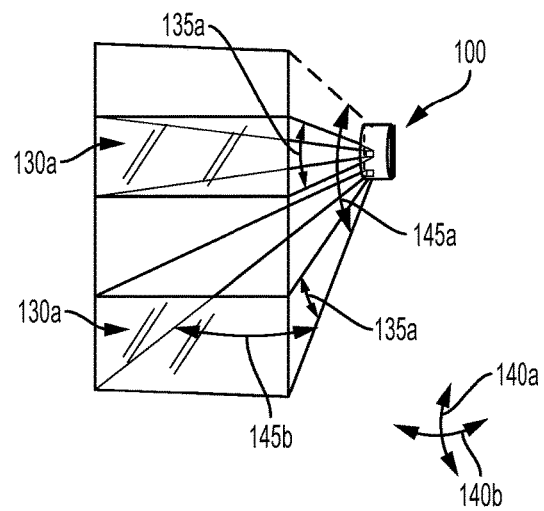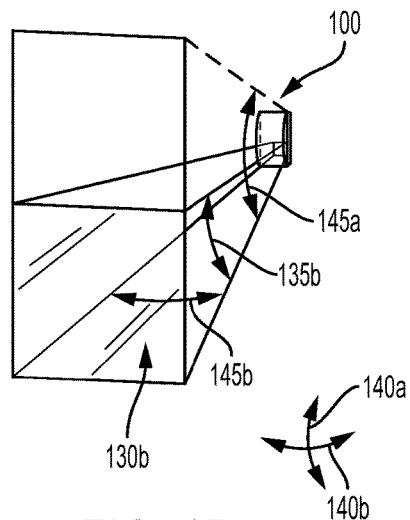
FIG. 1A   FIG. 1B
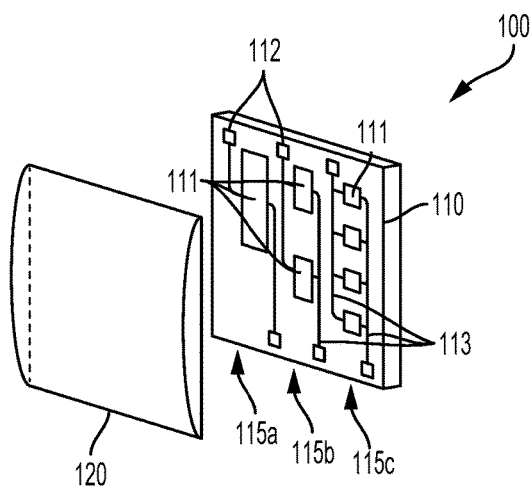
FIG. 1C

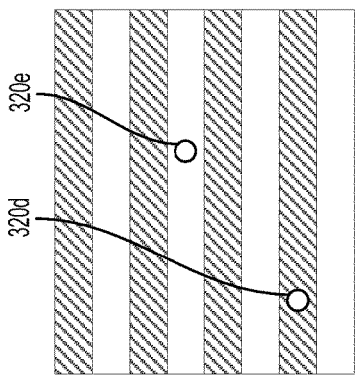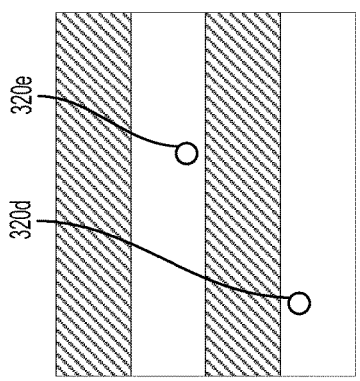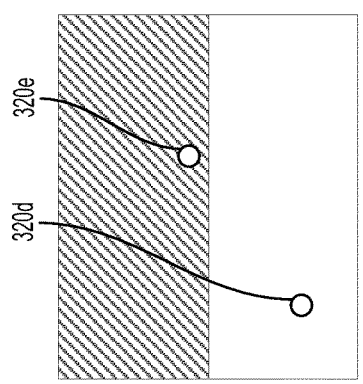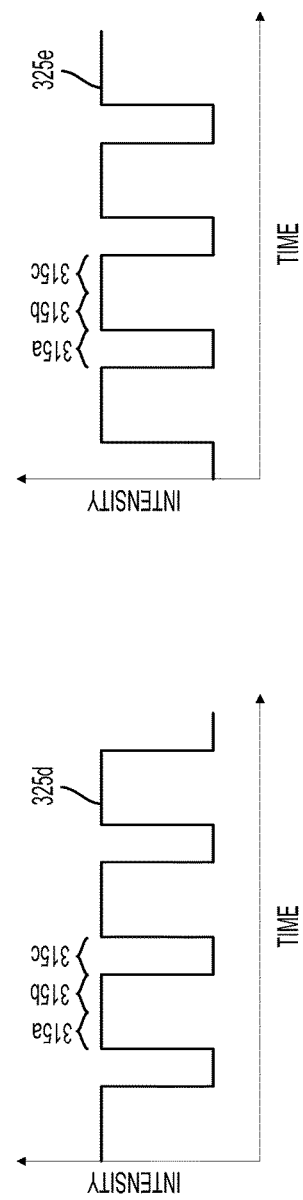

ARRAY BASED PATTERNED ILLUMINATION PROJECTOR

BACKGROUND

A variety of techniques exist to map the geometry of an environment and objects within the environment and/or to determine the location of objects of interest within the environment. These methods can include applying one or more patterns of illumination to the environment (e.g., an array of vertical and/or horizontal lines of illumination) and imaging the environment, using one or more cameras, when exposed to such illumination. Additionally or alternatively, a particular object within the environment could include a tag configured to detect the emitted illumination and the location of the tag could be determined based on the detected illumination. In a further example, a particular object within the environment could include a tag configured to emit illumination and/or to reflect illumination, and the location of the tag could be determined by imaging the environment with one or more cameras.

SUMMARY

Some embodiments of the present disclosure provide a device including: (i) an astigmatic optical element; and (ii) a die. The die includes a plurality of light emitting elements that are connected on the die to form a first set of one or more light emitting elements and a second set of one or more light emitting elements. The die is disposed relative to the astigmatic optical element such that light emitted from the first and second sets of one or more light emitting elements interacts with the astigmatic optical element to produce respective different patterns of illumination from the device within respective ranges of angles of a first range of angles in a first direction relative to the device. The patterns of illumination emitted from the device each illuminate all of a second range of angles in a second direction relative to the device, the second direction substantially orthogonal to the first direction.

Some embodiments of the present disclosure provide a system including: (i) a light emitter that includes an astigmatic optical element and a die; and (ii) a light detector that is operable to detect illumination emitted from the light emitter. The die includes a plurality of light emitting elements that are connected on the die to form a first set of one or more light emitting elements and a second set of one or more light emitting elements. The die is disposed relative to the astigmatic optical element such that light emitted from the first and second sets of one or more light emitting elements interacts with the astigmatic optical element to produce respective different patterns of illumination from the light emitter within respective ranges of angles of a first range of angles in a first direction relative to the light emitter. The patterns of illumination emitted from the light emitter each illuminate all of a second range of angles in a second direction relative to the light emitter, the second direction substantially orthogonal to the first direction.

Some embodiments of the present disclosure provide a method that includes providing, from a light emitter, a plurality of different patterns of illumination during respective periods of time. Providing each pattern of illumination includes providing illumination from the light emitter within respective ranges of angles within a first range of angles in a first direction relative to the light emitter. Each provided pattern of illumination illuminates all of a second range of angles in a second direction relative to the light emitter, the second direction substantially orthogonal to the first direction. The light emitter includes: (i) an astigmatic optical element; and (ii) a die. The die includes a plurality of light emitting elements that are connected on the die to form at least two sets of one or more light emitting elements. The die is disposed relative to the astigmatic optical element such that light emitted from each set of one or more light emitting elements interacts with the astigmatic optical element to emit a respective one of the plurality of different patterns of illumination from the light emitter. Producing a particular pattern of illumination during a period of time includes applying power, via interconnects of the die, to one of the sets of one or more light emitting elements.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 1A is a perspective view of an example light emitter when emitting a first pattern of illumination.

FIG. 1B is a perspective view of the example light emitter shown in FIG. 1A when emitting a second pattern of illumination.

FIG. 1C is a perspective view of elements of the example light emitter shown in FIGS. 1A and 1B.

FIG. 3A illustrates an example spatial pattern of illumination emitted from a light emitter during a first period of time.

FIG. 3B illustrates an example spatial pattern of illumination emitted from a light emitter during a second period of time.

FIG. 3C illustrates an example spatial pattern of illumination emitted from a light emitter during a third period of time.

FIG. 3D illustrates an example of a light intensity signal detected by a first light detector over time.

FIG. 3E illustrates an example of a light intensity signal detected by a second light detector over time.

DETAILED DESCRIPTION

Figure 2A:
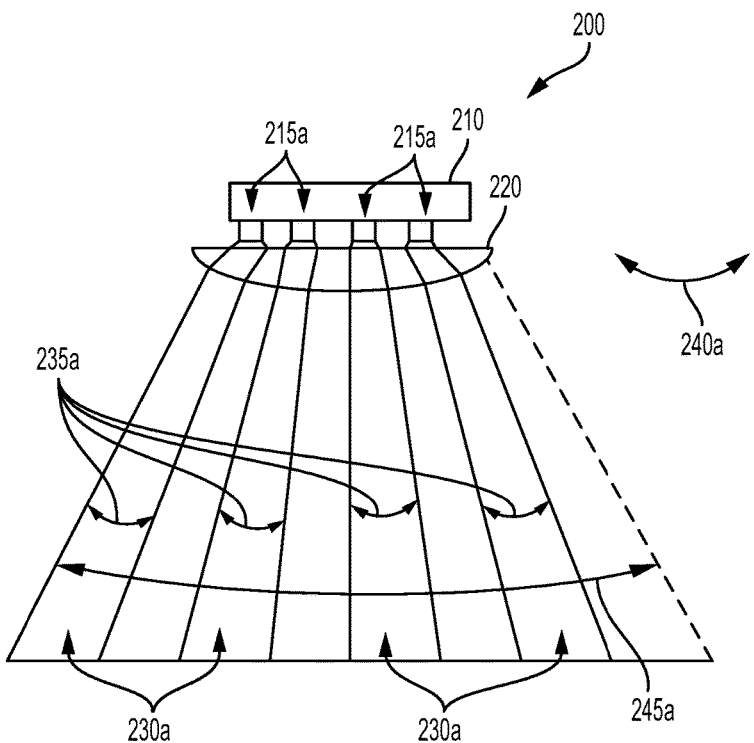
FIG. 2A is a cross-sectional schematic view of elements of an example light emitter.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. Overview

The location of objects in an environment can be determined by illuminating the environment with a plurality of different patterns of illumination over time. The patterns of illumination, and the timing of production of the patterns, could be specified such that different regions within the environment are exposed to different time-varying waveforms of light intensity. The location of an object in the environment could then be determined by detecting a time-varying waveform of light intensity received at one or more locations on the object and associating such detected waveforms with respective regions within the environment. For example, a light sensor disposed on an object of interest could detect a time-varying waveform of light intensity incident on the object and the location of the object (e.g., a location or angle of the object relative to one or more light emitters that are emitting different patterns of illumination over time) could be determined based on the detected time-varying waveform of light intensity.

Such a light emitter could emit different patterns of illumination that vary across a first range of angles in a first direction relative to the light emitter such that the emitted patterns of illumination serve to encode different regions of an environment with respect to the angle, in the first direction, of the regions relative to the light emitter. For example, a first pattern of illumination could illuminate a lower half of the first range of angles, a second pattern of illumination could illuminate a first quarter and a third quarter of the first range of angles, and a third pattern off illumination could illuminate first, third, fifth, and seventh eighths of the first range of angles such that emitting the first, second, and third patterns of illumination during respective periods of time may serve to encode eight different regions of the environment. A tag or other device in the environment could detect the light received, from the light emitter, at a particular point in the environment over time, and a time-varying waveform of such detected illumination could be used to determine the angle, relative to the light emitter in the first direction, of the tag. Such information could be used to determine the location, in one dimension or direction, of the tag relative to the light emitter and/or relative to the environment illuminated by the light emitter.

The emitted patterns of illumination could provide light across a range of angles in a second direction that is substantially orthogonal to the first direction (e.g., a second direction that is rotated from the first direction by between 80 degrees and 100 degrees). In such an example, the angle of a tag, relative to the light emitter in the first direction, could be determined based on light detected by the tag if the angle of the tag, relative to the light emitter, is (i) within the first range of angles relative to the first direction, (ii) within the second range of angles relative to the second direction, and (iii) the tag is sufficiently close to the light emitter, and there are no obstructions between the light emitter and the tag, such that light emitted from the light emitter may be detected by the tag.

Such different patterns of illumination could be emitted, during respective periods of time, in a variety of ways. In some examples, a projector that is configured to emit arbitrary patterns of illumination (e.g., a device that uses a digital micromirror device, a liquid crystal on silicon spatial light modulator, or some other means to control a spatial pattern of light emitted from the projector) could be operated to generate such different patterns of illumination to encode regions of an environment. Alternatively, a light emitter could include one or more dies comprising a plurality of light emitting elements (e.g., light-emitting diodes (LEDs), vertical-cavity surface-emitting lasers (VCSELs)) and an astigmatic optical element configured to illuminate an environment as described above, e.g., to provide different patterns of illumination that vary across a first range of angles relative to the light emitter such that the emitted patterns of illumination serve to encode different regions of the environment with respect to angle in the first direction relative to the light emitter. The astigmatic optical element can be configured to interact with light emitted from the die such that the light is focused in the first direction while being spread in a second direction that is orthogonal to the first direction.

The astigmatic optical element could include an aspheric cylindrical lens or other optical components(s) disposed relative to the die such that the location and extent of a particular light emitting element, on the die, corresponds to the angle(s), within the first range of angles relative to the device, illuminated by the light emitter when the particular light emitting element is emitting light. Thus, each pattern of illumination emitted from the light emitter may correspond to a set of light emitting elements of the die. Such a light emitter may be more energy efficient due to only generating light that is used to illuminate an environment of interest instead of generating and then discarding light for non-illuminated regions of the environment (e.g., by not discarding light to a light dump using a micromirror device, by not discarding light through absorption by segments of a liquid crystal device). Further, such a light emitter may be very small, as it does not require masks, light dumps, or other elements beyond the die and astigmatic optical element. Disjoint sets of light emitting elements may be provided on the die and may be operated, by applying current via interconnects of the die, to generate respective different patterns of illumination from such a light emitter. By using a disjoint set of one or more light emitting elements for each different pattern of illumination produced by the light emitter, a number of terminals or interconnects between the die and a controller or other electronics may be reduced (e.g., relative to a die that includes an array of independently controllable light emitting elements, with each light emitting element of the array used to illuminate a respective, disjoint range of angles of an environment).

Multiple such light emitters may be provided, e.g., to provide different patterns of illumination over time such that the angle and/or location of a tag or other light-sensitive device in an environment may be determined with respect to two or more angles and/or directions. For example, a first light emitter could provide different patterns of illumination, from a particular location, that encode regions of an environment with respect to a first direction. A second light emitter could provide different patterns of illumination, from the particular location, that encode regions of an environment with respect to a second direction that is orthogonal to the first direction. A light detector within the environment could detect time-varying waveforms of light received from the first and second light emitters and use such detected waveforms of light to determine the angle of the light detector in the first and second directions relative to the particular location. Additionally or alternatively, multiple light emitters could be located at two or more different locations and the location of a light detector in an environment, relative to the two or more different locations, could be determined from time-varying waveforms of light from the light emitters that is detected by the light detector, e.g., using triangulation. A light detector receiving time-varying waveforms of illumination from two or more light emitters could include the light emitters emitting illumination during respective different, non-overlapping periods of time (e.g., using a method of time division multiplexing), the light emitters emitting light having different wavelengths (e.g., using a method of wavelength multiplexing), or the light emitters emitting light that is distinguishable, by a light detector, by some other method.

It should be understood that the above embodiments, and other embodiments described herein, are provided for explanatory purposes, and are not intended to be limiting.

II. Example Patterned Illumination and Object Location Detection

It can be beneficial in a variety of applications to detect and/or determine the location of an object in an environment. These applications can include tracking the location of a drone, a ball used in a game, a conductor's baton, a controller, a body part of a person (e.g., for motion capture or gesture recognition), or some object(s). In an example application, the location of a plurality of markers or tags disposed on respective different locations on a person's body could be determined and used to detect the location and/or motions of the person and/or of particular parts of the person's body. In another example application, the location of a control wand or other device, relative to a head-mounted device or other device worn by a person, could be detected and used as an input to the head-mounted device or other system. In yet another example application, the location of a drone, robot, or other mobile system within an environment of interest (e.g., a room of a house, a warehouse, a factory) could be determined and used to control the motion of the drone, robot, or other mobile system within the environment.

Determining the location of an object in an environment can include determining an absolute location of the object (e.g., relative to a defined coordinate system within the environment) and/or determining the location of the object relative to one or more other objects (e.g., relative to another object whose absolute or relative location is being determined, relative to a camera used to generate data used to determine the location of the object, relative to a light emitter used to illuminate the object). Determining the location of an object could include determining a location (e.g., a displacement) of the object and/or determining an angle of the object relative to a defined coordinate system within the environment and/or relative to the location and/or orientation of some other object or device in the environment (e.g., relative to a camera, relative to a light emitter, relative to a person and/or a person's gaze direction).

The location of an object within an environment could be determined via a variety of methods. In some examples, the location of the object could be determined by illuminating the object (e.g., with illumination having a pattern of light that is specified over time and/or space) and/or receiving light from the object (e.g., imaging the environment that includes the object using, e.g., a camera). The object could include a tag that is configured to emit light (e.g., a tag that is configured to emit a time-coded pattern of light to identify the tag) and/or to reflect light from a light emitter to a light detector (e.g., a tag that includes retroreflective material) to facilitate optical determination of the location of the object. Additionally or alternatively, the object could include a tag that is configured to detect light received by the object, and a pattern over time of the intensity of such detected light, or some other property of the detected light, could be used to determine the location of the object.

Such an arrangement may include one or more light emitters illuminating the environment with patterns of illumination that are specified over time and/or space such that different regions of the environment are illuminated by different patterns of illumination over time. Thus, the pattern of illumination detected over time by a light detector on an object could be used to determine the region of the environment within which the object is located. Producing such patterns of illumination could include scanning one or more shaped beams of light across the environment, providing a plurality of different patterns of light to the environment over time, or providing illumination to an environment in some other way such that the pattern of illumination received over time by a light detector located within the environment can be used to determine a location of the light detector within the environment. The provided illumination could vary according to an angle relative to a light emitter (e.g., an angle in one or more directions relative to the light emitter) such that a detected intensity of the illumination over time could be used to determine the angle of a light detector (in one or more directions) relative to the light emitter.

In a particular example, a light emitter could be configured to provide a plurality of different patterns of light during respective different periods of time. Each of the patterns of light could provide light to the environment that varies across a first range of angles in a first direction while not varying, or varying to a functionally insignificant degree, across a second range of angles in a second direction that is substantially orthogonal to the first direction (e.g., the first direction and second direction could be differ, relative to each other, by between 80 degrees and 100 degrees). Thus, as the different patterns of illumination are produced by the light emitter over time, different regions of the environment can receive respective different time-varying patterns of intensity of the emitted illumination. As each of the patterns of illumination varies with respect to angle in the first direction within the first range of angles, while not varying with respect to angle in the second direction within the first range of angles, the time-varying patterns of illumination intensity received by a particular region of the environment (that is located within the first ranges of angles in the first direction and the second range of angles in the second direction, relative to the light emitter) can be used to determine the angle of the particular region, in the first direction, relative to the light emitter.

This is illustrated by way of example in FIGS. 1A and 1B. FIG. 1A illustrates a light emitter 100 during a first period of time, when the light emitter 100 is producing an example first pattern of illumination 130a. The first pattern of illumination 130a provides illumination to a first set of ranges of angles 135a within a first range of angles 145a relative to the light emitter 100 in a first direction 140a. The first pattern of illumination 130a provides illumination to all of a second range of angles 145b relative to the light emitter 100 in a second direction 140b, where the second direction 140b is approximately orthogonal to the first direction 140a (that is, an angle between the second direction 140b and the first direction 140a is between 80 degrees and 100 degrees). As illustrated, the example first set of ranges of angles 135a includes two ranges of angles: a first quarter and a third quarter of the first range of angles 145a. Thus, if a light detector detects light from the light emitter 100 during the first period of time, it could be determined that the location of the light detector, relative to the light emitter, is within the first set of ranges of angles 135a in the first direction 140a relative to the light emitter 100 and within the second range of angles 145b in the second direction 140b relative to the light emitter.

FIG. 1B illustrates a light emitter 100 during a second period of time, when the light emitter 100 is producing an example second pattern of illumination 130b. The second pattern of illumination 130b provides illumination to a second set of ranges of angles 135b within the first range of angles 145a relative to the light emitter 100 in the first direction 140a. The second pattern of illumination 130b provides illumination to all of the second range of angles 145b relative to the light emitter 100 in the second direction 140b. As illustrated, the example second set of ranges of angles 135b includes a single range of angles: a first half of the first range of angles 145a. Thus, if a light detector detects light from the light emitter 100 during the second period of time, it could be determined that the location of the light detector, relative to the light emitter, is within the second set of ranges of angles 135b in the first direction 140a relative to the light emitter 100 and within the second range of angles 145b in the second direction 140b relative to the light emitter.

The duration of the periods of time during which the light emitter 100 produces each pattern of illumination, and the rate at which a sequence of such different patterns of illumination is repeated, could be specified to facilitate the determination of the location of a light detector or other object at more than a specified rate. For example, a sequence of patterns of illumination produced by the light emitter 100 could be repeated at a rate greater than 10 Hertz. In examples wherein ten or more different patterns of illumination are produced during each repetition of such a sequence (e.g., to provide ten or more bits of resolution for the determination of the location of the light detector or other object in the first direction relative to the light emitter 100), each pattern of illumination could be provided during respective time periods that are less than 10 milliseconds in duration.

Determination of the location of an object (e.g., determination of the angle of a light detector in the first direction relative to the light emitter 100) based on time-varying patterns of illumination received from the light emitter 100 can include determining the timing of detection of the illumination (e.g., the timing of detection of a plurality of measurement of the intensity of light received by a light detector) relative to the timing of time periods during which each of a number of different patterns of illumination are produced by the light emitter 100. In some examples, such timing information could be determined by the light emitter 100 and a light detector both including highly accurate, synchronized clocks. In other examples, the light emitter 100 could include a radio frequency transmitter (or other means for wireless information transmission) that is operated to emit such timing information. In still further examples, such timing information could be recovered from the time-varying pattern of illumination received by a light detector from the light emitter 100, e.g., by recovering pulse timing information from changes (e.g., rising or falling edges) in a detected time-varying illumination signal.

Further, if such a light detector detects light from the light emitter 100 during the first period of time, it could be determined that the location of the light detector, relative to the light emitter, is within the first quarter of the first range of angles 145a in the first direction 140a relative to the light emitter 100. Other time-varying patterns of illumination, detected by a light detector, could be indicative of the location of the light detector in other ranges of angles (e.g., other quarters of the first range of angles 145a) in the first direction 140a relative to the light emitter. Additional or alternative patterns of illumination could be emitted from the light emitter 100, during respective periods of time, to facilitate determination of the location of a light detector to a greater resolution (e.g., patterns of illumination that subdivide the first range of angles 145a into narrower partitions, e.g., eighths, sixteenth, thirty-seconds, etc.) or according to some other consideration.

A light emitter (e.g., light emitter 100) could be configured and/or operated in a variety of ways to produce, during respective periods of time, patterns of illumination as described herein. In a particular example, a light emitter could include, disposed on a die (e.g., a die composed of gallium arsenide or some other semiconductor material(s)), a plurality of light-emitting elements. The die is disposed relative to an astigmatic optical element (e.g., a grating, a cylindrical lens) and the light-emitting elements could be connected on the die to form a number of sets of light-emitting elements such that, when a particular set of light-emitting elements is operated to produce light, the light-emitter produces a respective pattern of illumination as described herein. The location of the light emitting-elements of a particular set of light-emitting elements set on the die and relative to the astigmatic optical element could be specified to control the pattern of illumination emitted by the particular set of light-emitting elements.

This is illustrated by way of example in FIG. 1C. As shown in FIG. 1C, the light emitter 100 includes a die 110 disposed relative to an astigmatic optical element 120 that takes the form of a single, aspheric cylindrical refractive lens. The die 110 includes a plurality of light-emitting elements 111 (e.g., LEDs, lasers, VCSELs) that are connected on the die 110 by interconnects 113 to form first 115a, second 115b, and third 115c sets of one or more light-emitting elements. The interconnects 113 are further connected to terminals 112 on the die 110 such that each of the sets of light-emitting elements can be operated by providing current and/or voltage via corresponding terminals of the die 110.

The illustrated method for producing patterns of illumination by providing such patterns of illumination from a set of light-emitting elements (e.g., 111) of a die (e.g., 110), via an astigmatic optical element (e.g., 120) can have a number of benefits relative to other methods and/or apparatuses for generating such patterns of illumination. The energy efficiency of generating patterns of illumination using a light emitter as described herein can be greater than other methods of generating such patterns of illumination (e.g., by absorbing or otherwise blocking a portion of an emitting light using a mask, by reflecting, by a digital micromirror device, a specified portion of light produced by a light source to be absorbed by a light sink or other element). Further, forming a plurality of light-emitting elements on a die, an alignment between different sets of the light-emitting elements can be precisely controlled. This could allow for increased alignment between features (e.g., ranges of angles of emitted illumination) of different produced patterns of illumination that correspond to the respective different sets of light-emitting elements. Still further, incorporating the light-emitting elements into a single die that is adhered to or otherwise disposed relative to an astigmatic optical element can provide a light-emitting device that has a small size relative, e.g., to other light-emitting apparatus that include multiple masks, light emitting elements, or other optical elements, or other means for producing patterns of illumination as described herein. By connecting the light-emitting elements 111 of the die 110, via the interconnects 113, into a number of sets of light-emitting elements that correspond to respective emitted patterns of illumination, the different patterns of illumination can be produced without the use of electronic switches (e.g., transistors) being present on the die 110. Other advantages of the methods and apparatuses for generating patterns of illumination described herein may be used.

The illustrated locations and sizes of the light-emitting elements 111 on the die 110, their interconnection with each other and with the terminals 112 by the interconnects 113, the patterns of illumination 130a, 130b, and other details of the light emitter 100 illustrated in FIGS. 1A, 1B, and 1C are intended as non-limiting illustrative embodiments of the methods and apparatus described herein. Different locations of light-emitting elements on a die, corresponding to different patterns of emitted illumination, are anticipated by the inventors. Further, different interconnections of sets of light-emitting elements and terminals of a die may be used. For example, first and second sets of light-emitting elements could be connected, with opposite polarities, to first and second terminals of a die such that a selected one of the first and second sets of light-emitting elements could be operated to emit light by controlling a polarity of voltage provided to the sets of light-emitting elements via the first and second terminals. The number of terminals of a die used to provide current and/or voltage to sets of light-emitting elements of the die could be further reduced by using a terminal in common between a number of sets of light-emitting elements and/or pairs of sets of light-emitting elements. Other configurations of interconnections between light-emitting elements and terminals of a die may be used.

The light-emitting elements 111 could include LEDs, VCSELs, lasers, or other light-emitting components formed on or from the die 110. For example, the light-emitting elements 111 could include light-emitting diode regions, light-emitting quantum wells, Bragg reflectors, or other elements formed from gallium arsenide, aluminum gallium arsenide, positive or negative doping materials, or other materials or structures. Forming the light-emitting elements 111 could include photopatterning, photolithography, chemical vapor deposition, sputtering, ion implantation, or other methods for forming elements of an integrated optoelectronic circuit.

The astigmatic optical element of a light emitter as described herein could be configured in a variety of ways, and include a variety of elements (e.g., lenses, mirrors, diffraction gratings, prisms) such that light emitted from a set of light-emitting elements of a die of the light emitter is projected, via the astigmatic optical element, as a pattern of illumination that varies with angle across a first range of angles in a first direction (e.g., that provides illumination within one or more ranges of angles within the first range of angles) and that does not varying, or varying to a functionally insignificant degree, across a second range of angles in a second direction that is substantially orthogonal to the first direction. This could include focusing and/or deflecting light from the die, with respect to the first direction, such that the location of a particular light-emitting element on the die is related to a range of angles of the environment, in the first direction, that receive illumination from the particular light-emitting element. This could further include defocusing and/or spreading light from the die with respect to the second direction.

Figure 2B:
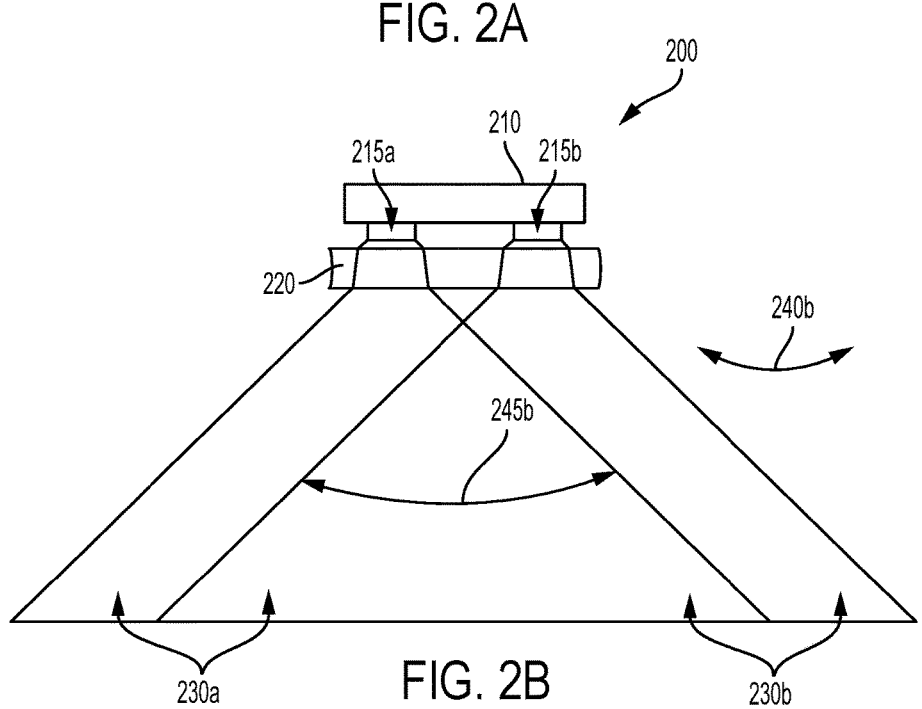
FIG. 2B is a cross-sectional schematic view of elements of the example light emitter shown in FIG. 2A.

FIGS. 2A and 2B illustrate, in cross-section, the effect of an example astigmatic optical element 220 of a light emitter 200 on light emitted from light-emitting elements of a die 210 of the light emitter 200. Note that the dimensions, angles of emitted illumination, operation of the astigmatic optical element 220 to refract light, and other aspects of FIGS. 2A and 2B are intended to conceptually illustrate the production of patterns of illumination by a light emitter as described herein and are not intended to literally represent optical or other properties (e.g., angles or locations of rays of light, emission patterns of LEDs, apparent refractive indices of optical elements, focal lengths of refractive elements, an overall divergent or convergent character of a refractive element and/or of a light field produced by such an element, angles of refraction of rays of light by refractive elements) of a particular embodiment of such a light emitter.

FIG. 2A shows a cross-section through the die 210 and astigmatic optical element 220 of the light emitter 200 parallel to a first direction 240a relative to the light emitter. A first set of one or more light-emitting elements 215a of the die 210 are also shown. A first pattern of illumination 230a emitted from the first set of one or more light-emitting elements 215a provides illumination within a first set of ranges of angles 235a within a first range of angles 245a in the first direction 240a. The astigmatic optical element 220 is configured to focus, refract, deflect, or otherwise modify light emitted from light-emitting elements of the die 210 such that a pattern of illumination produced by the operation of such light-emitting elements can provide illumination that varies across the first range of angles 245a according to the location on the die 210, emission profile, or other properties of the light-emitting elements on the die 210 and/or the location and orientation of the die 210 relative to the astigmatic optical element 220. Properties of the astigmatic optical element 220, the die 210 (e.g., an emission profile of the light emitting elements of the die 210, the presence of microlenses on light-emitting elements of the die 210), or other elements of the light emitter 200 could be specified such that the first range of angles 245a covers a specified portion of an environment of interest; for example, the first range of angles 245a could span more than 60 degrees.

FIG. 2B shows a cross-section through the die 210 and astigmatic optical element 220 of the light emitter 200 parallel to a second direction 240b relative to the light emitter 200. The second direction 240b is substantially orthogonal to the first direction 240a. The first set of one or more light-emitting elements 215a and a second 215b set of one or more light-emitting elements of the die 210 are also shown. The first pattern of illumination 230a emitted from the first set of one or more light-emitting elements 215a and a second pattern of illumination 230b emitted from the second set of one or more light-emitting elements 215b provides illumination to all of a second range of angles 245b in the second direction 240b. The astigmatic optical element 220 could be configured to focus, defocus, or otherwise modify light emitted from light-emitting elements of the die 210 such that the patterns of illumination produced by the operation of such light-emitting elements can provide illumination across all of the second range of angles 245b (e.g., such light-emitting elements can provide illumination that does not vary, or that varies to a functionally insignificant degree, across all of the second range of angles 245b). Alternatively, the astigmatic optical element 220 could provide substantially no focusing or defocusing of the emitted light, with respect to the second direction, such that the second range of angles 245b corresponds to an emission profile of the light-emitting elements of the die 210 and/or to optical properties of some other element of the light emitter 200 (e.g., to an optical power of microlenses on light-emitting elements of the die 210). Properties of the astigmatic optical element 220, the die 210, or other elements of the light emitter 200 could be specified such that the second range of angles 245b covers a specified portion of an environment of interest; for example, the second range of angles 245b could span more than 60 degrees.

Note that, in practice, the displacement in the second direction 240b between light-emitting elements of different sets of light-emitting elements of the die 210 is likely to be very small (e.g., on the order of millimeters). As such, the degree of overlap between the ranges of angles, in the second direction 240b, between the ranges of angles of illumination provided by different sets of light-emitting elements of the die 210 is likely to be greater than that shown in FIG. 2B.

As shown in FIGS. 2A and 2B, the astigmatic optical element 220 includes a single refractive aspheric cylindrical lens. However, an astigmatic optical element of a light emitter, as described herein, could include additional or alternative elements configured to focus, deflect, or otherwise modify light emitted from light-emitting elements of a die of the light emitter such that a pattern of illumination produced by sets of one or more light-emitting elements of the die can be operated to produce respective different patterns of illumination as described elsewhere herein. For example, such an astigmatic optical element could include a diffraction grating, a hologram, or some other reflective, refractive, and/or absorptive elements. The astigmatic optical element could include a reflective element having an aspheric optical surface. The astigmatic optical element could include a single lens, mirror, grating, or other optical element. Alternatively, the astigmatic optical element could include multiple optical components, e.g., multiple lenses, multiple gratings, or multiple mirrors.

In some examples, the astigmatic optical element could include a single refractive or reflective lens having a first surface having a geometry specified to focus and/or deflect the emitted light in a first direction (e.g., a cylindrical geometry, an aspheric cylindrical geometry) such that the location of a particular light-emitting element on the die, in the first direction, corresponds to the range of angles, in the first direction, of light emitted from the light emitter when the particular light-emitting element is operated to emit light. Such a refractive or reflective lens could include a second surface having a geometry specified to defocus and/or spread the emitted light in a second direction that is substantially orthogonal o the first direction (e.g., a concave geometry) such that each light-emitting element of the die, when operated to emit light, provides light across a similar range of angles in the second direction.

Components or features of the astigmatic optical element could be formed on the die, e.g., by forming conductive traces, optically transparent materials, or other elements on the surface of the die, e.g., using methods used for integrated circuit fabrication. Additionally or alternatively, the astigmatic optical element could be bonded to the die using an adhesive, clips, an armature, or some other means. This could include bonding the astigmatic optical element (e.g., using an adhesive) to the die directly, to a package that encloses the die (e.g., a ceramic, metal, or polymer integrated circuit package that includes a window), to a circuit board to which the die is mounted, or to some other component of a light emitter. A light emitter could include further optical elements in addition to the astigmatic optical element; for example, a plurality of microlenses could be provided on the surface of the dye to focus, collimate, or otherwise modify the emission pattern of light emitted from each of the light-emitting elements of the die.

As noted above, a light emitter (e.g., 100, 200) could be operated to provide a number of different patterns of illumination, during respective different periods of time, to an environment. The patterns of illumination could be specified such that an intensity of illumination received over time by an object in the environment (e.g., by a light detector of such an object), from the light emitter, could be used to determine the location of the object within the environment, e.g., to determine the angle of the object relative to the light emitter. This could include determining a pattern of light received by the object from the light emitter during a plurality of different periods of time during which the light emitter produces respective different patterns of illumination. The location of the object (e.g., the angle of the object relative to the light emitter) could then be determined by determining a region (e.g., a range of angles) within the environment that corresponds, based on the different patterns of illumination, to the pattern of received light.

This is illustrated by way of example by FIGS. 3A, 3B, 3C, 3D, and 3E. FIGS. 3A, 3B, and 3C illustrate respective first 310a, second 310b, and third 310c patterns of illumination that a light emitter as described herein could provide to an environment during respective first, second, and third periods of time, or during further periods of time (e.g., according to a repeating sequence over time). Each of the patterns of illumination provides illumination to a respective one or more ranges of angles within a first range of angles in a first direction (a vertical direction within FIGS. 3A, 3B, and 3C) and to all of a second range of angles in a second direction that is orthogonal to the first direction (a horizontal direction within FIGS. 3A, 3B, and 3C). Regions of the environment that are receiving illumination in each of FIGS. 3A, 3B, and 3C are illustrated as open regions; regions of the environment that are not receiving illumination are illustrated with diagonal shading lines. As shown in FIG. 3A, the first pattern of illumination 310a provides illumination to a lower half of the first range of angles; as shown in FIG. 3B, the second pattern of illumination 310b provides illumination to a first quarter and a third quarter of the first range of angles; and as shown in FIG. 3C, the third pattern of illumination 310c provides illumination to a first eighth, a third eighth, a fifth eighth, and a seventh eighth of the first range of angles.

Also illustrated in FIGS. 3A, 3B, and 3C are the locations in the environment of example first 320d and second 320e light detectors (e.g., of respective example first and second objects). The intensity of illumination received by each of the first 320d and second 320e light detectors from the light emitter during the first, second, and third periods of time and/or further periods of time could be used to determine the locations of the first 320d and second 320e light detectors.

The pattern of illumination received by the first light detector 320d over time as the first 310a, second 310b, and third 310c patterns of illumination are provided to the environment in a repeating sequence, is shown in FIG. 3D as a first example time-varying intensity signal 325d. The first, second, and third periods of time are indicated in FIG. 3D by first 315a, second 315, and third 315c indicated time periods, respectively. As illustrated in FIGS. 3A, 3B, 3C, and 3D, the first light detector 320d receives light during the first 315a and second 315b periods of time and does not receive illumination during the third period of time 315c; thus, it could be determined from the received time-varying pattern of illumination that the first light detector 320d is located, relative to the light emitter, within a second eighth of the first range of angles. FIG. 3E shows a second example time-varying intensity signal 325e received by the second light detector 320e over time. As illustrated in FIGS. 3A, 3B, 3C, and 3E, the second light detector 320e receives light during the second 315b and third 315c periods of time and does not receive illumination during the first period of time 315a; thus, it could be determined from the received time-varying pattern of illumination that the second light detector 320e is located, relative to the light emitter, within a fifth eighth of the first range of angles.

As described above, determining the location of an object based on a detected time-varying intensity of light received from a light emitter can include making such determinations based on information about the timing of patterns of illumination emitted from the light emitter. Such timing information could be based on an internal clock of a controller of the object, or based on timing information received using a receiver (e.g., timing information transmitted via radio frequency signals from the light emitter). Additionally or alternatively, the timing information could be present in the timing of emission of patterns of illumination by the light emitter. For example, the light emitter could provide illumination to all of the first range of illumination during one or more particular periods of time to provide synchronization timing or other data to an object. In some examples, providing one or more of the patterns of illumination could include modulating one or more of the provided patterns of illumination (e.g., by varying an intensity of the provided illumination across a range of intensities and/or between a number of different discrete levels of illumination) at a specified frequency or according to some other pattern over time to provide timing information (e.g., to identify one or more of the patterns of illumination as a 'first' pattern in a sequence of patterns of illumination) or to provide some other information.

Note that the illustrated patterns are intended as non-limiting examples of patterns that could be provided by a light emitter as described herein. For example, while the illustrated example patterns of illumination (e.g., 310a, 310b, 310c) divide a range of angles of an environment according to binary partitions of the range of angles (e.g., by providing illumination to odd-numbered binary sub-ranges of a range of angles, that is, by providing illumination to a first half of the range of angles during a first period of time, providing illumination to first and third quarters of the range of angles during a second period of time, etc.), other partitions or patterns of illumination could be provided. For example, each of a set of patterns of illumination could illuminate a respective set of angles such that different regions within the environment receive illumination, during respective different periods of time, according a gray code. In a further example, a set of patterns of illumination provided by a light emitter could vary across a first ranges of angles; a further pattern of illumination could provide illumination to all of the first range of angles. Such a pattern could be provided, as described above, to provide timing or other information to objects in the environment. Additionally or alternatively, such a pattern of illumination could be used to determine whether a given object is within the first range of angles and thus whether the light emitted from the light emitter can be used to determine the location of the given object.

In yet another example, one or more pairs of the patterns of illumination could be complementary. That is, a first pattern of illumination could illuminate a first range of angles in a first direction and a second pattern of illumination could illuminate a second range of angles in the first direction, and the first and second ranges of angles could be substantially non-overlapping (that is, the first range of angles and the second range of angles could have in common less than 5% of the total range of angles included in the first and second ranges of angles). Such first and second patterns could be provided simultaneously, e.g., to provide illumination to all of a range of angle of interest (e.g., to provide timing information or according to some other application, as described elsewhere herein). Such first and second patterns could be provided during respective different periods of time, e.g., to control a mean detected intensity of illumination detected by objects in an environment, to control a bandwidth of the time-varying pattern of the intensity detected by objects in the environment, to provide sufficient changes in the detected intensity to recover a clock signal, or to provide for some other consideration.

As illustrated in the Figures (e.g., in FIGS. 3A, 3B, and 3C), patterns of illumination provided by light emitters as described herein can each provide illumination to approximately half of a range of angles of interest (e.g., between approximately 45% and 55% of a specified range of angles of interest). Such patterns of illumination can be specified to each illuminate approximately half of a range of angles of interest in order to equally subdivide the range of angles of interest and to facilitate determination of the location of objects within the range of angles of interest to a similar degree of resolution across the range of angles of interest. Alternatively, some or all of the patterns of illumination could illuminate significantly more or less than half of the range of interest, e.g., to facilitate determination of the location of objects within the range of angles of interest to different degrees of resolution or accuracy at different locations within the range of angles of interest.

A number of different patterns of illumination (and corresponding number of sets of one or more light-emitting elements on a die of a light emitter) could be specified to provide determination of the location of an object in an environment of interest to at least a specified resolution or accuracy. For example, ten or more different patterns of illumination could be provided by a light emitter (e.g., from ten or more corresponding sets of one or more light emitting elements of a die of the light emitter) during respective different periods of time (e.g., during a plurality of repeated respective periods of time, according to a repeating sequence in time of producing the different patterns of illumination). Each of the provided patterns of illumination, when detected by a light detector of an object in the environment during a respective period of time, could provide a corresponding bit of resolution in determining the location of the object. As noted above, the number of provided different patterns of illumination could be specified to facilitate determination of the location of such an object to a specified degree of resolution; providing ten or more different patterns of illumination could facilitate the determination of the location of an object to a resolution of less than 1 millimeter when such an object is within 1.2 meters of a light emitter that is providing the patterns of illumination within a range of angles relative to the light emitter that spans less than 80 degrees.

As described herein, a light emitter that includes a die and a single astigmatic optical element can be operated to provide, to an environment of interest, a plurality of different patterns of illumination, during respective periods of time, that vary with respect to angle in a first direction and that do not vary, or that vary in a functionally negligible fashion, with respect to angle in a second direction that is orthogonal to the first direction. That is, each pattern provides illumination to one or more ranges of angles within a first range of angles in the first direction and to all of a second range of angles in the second direction. A detected time-varying intensity of such illumination, received by an object that is located within the environment, could be used to determine the location of the object in relative to the light emitter in the first direction. One or more further light emitters could be provided to further determine the location of such an object in the environment. Such a further light emitter could include a further die and a further astigmatic element coupled thereto such that the further light emitter could provide, from two or more sets of one or more light emitters on the further die, two or more further patterns of illumination that vary with respect to angle in a third direction and that do not vary with respect to angle in a fourth direction that is orthogonal to the third direction (that is, each pattern provides illumination to one or more ranges of angles within a third range of angles in the third direction and to all of a fourth range of angles in the fourth direction).

A detected time-varying intensity of illumination provided by such a further light emitter, received by the object that is located within the environment, could be used to determine the location of the object in relative to the further light emitter in the third direction. Such information could be used to further determine the location of the object in the environment. This could include, in examples wherein the light emitters are co-located and oriented such that the light emitters emit respective patterns of illumination in the same direction such that the first and third directions are rotated relative to each other (e.g., such that the first and third directions are substantially orthogonal, that is, such that the first and third directions differ by between 80 degrees and 100 degrees), determining the angle of the object relative to the light emitters in two orthogonal directions. In another example, the light emitters could be located at different locations in the environment, and determining the location of the object based on the illumination received by the object from the light emitters could include determining that the object is located on a particular plane or line within the environment based on the detected illumination and on the relative locations and orientations of the light emitters in the environment. Determining the location of an object relative to a single light emitter in more than one direction and/or relative to multiple light emitters in respective multiple directions can facilitate determination of the location of the object in two or three dimensions relative to the light emitter(s) and/or relative to a defined coordinate system.

Illumination received by an object (e.g., by a light detector of the object) from two (or more) different light emitters could detected in a variety of ways. In an example, the light emitters could emit patterns of illumination during respective different periods of time. In such an example, detecting the illumination from the two different light emitters could include operating a light detector of the object to detect light received by the object during the respective different periods of time. In another example, the different light emitters could emit illumination at respective different wavelengths and detecting the illumination from the two different light emitters could include operating multiple light detectors (e.g., light detectors coupled to respective wavelength-selective filters corresponding to the different wavelengths of the light emitted by the light emitters) of the object to detect light incident on the object at the respective different wavelengths. In yet another example, the illumination emitted from each of the light emitters could be modulated at a respective different frequency, and detecting the illumination from the two different light emitters could include filtering a light intensity signal detected using a light detector of the object or otherwise extracting contents of such a detected light intensity signal at the respective different frequencies. Additional or alternative methods of detecting the intensity over time of light received by an object from two or more light emitters as described herein are anticipated by the inventors.

III. Example Dies

As described elsewhere herein, a light emitter could include a die and an astigmatic optical element configured to provide two or more patterns of illumination from the light emitter that vary according to angle in a specified direction relative to the light emitter by generating light from corresponding two or more sets of one or more light-emitting elements of the die. The location of such light-emitting elements on the die could correspond to the angle or range of angles of illumination produced from the light emitter when the light-emitting element(s) are operated to generate light. A light emitter configured in this way can provide such patterns more efficiently, in a smaller form factor, with minimal components and for minimal cost, or according to some other consideration in a manner that is improved relative to other apparatus or methods for producing such patterns of illumination (e.g., using a digital micromirror device to control which portions of light produced by a light source will be provided to an environment). Such a die and/or astigmatic optical element could be configured in a variety of ways to facilitate production of a variety of different patterns of illumination.

For example, while such a light emitter is described elsewhere herein as including a single die that is disposed relative to an astigmatic optical element, multiple dies could be disposed relative to such an astigmatic optical element to provide respective patterns of illumination from respective sets of light-emitted elements of the different dies. Such different dies could be provided to increase a degree of power dissipation from the dies, to increase a total number of sets of light-emitting elements on the dies and corresponding total number of different patterns of illumination that can be provided by the light emitter, or to provide some other functionality. This is illustrated by way of example in FIG. 4A, which shows a first die 410a and a second die 420a that each include respective pluralities of light-emitting elements.

The first die 410a includes first 415a and second 417a sets of one or more light-emitting elements that are each connected on the first die such that each of the first 415a and second 417a sets of light-emitting elements can be operated to produce a respective pattern of illumination, via an astigmatic optical element (not shown), from a light emitter that includes the dies 410a, 420a. The second die 420a includes third 425a and fourth 427a sets of one or more light-emitting elements that are each connected on the second die such that each of the third 425a and fourth 427a sets of light-emitting elements can be operated to produce a respective pattern of illumination, via the astigmatic optical element (not shown), from the light emitter. Each of the sets of one or more light-emitting elements 415a, 417a, 425a, 427a, when operated to generate light, produces a respective pattern of illumination such that illumination is provided to a respective one or more ranges of angles within a first range of angles in a first direction relative to the light emitter and such that illumination is provided across a second range of angles in a second direction that is substantially orthogonal to the first direction.

In some examples, a single light-emitting element could be provided, as part of a single interconnected set of one or more light-emitting elements of a die of a light emitter, to provide light across a continuous range of angles relative to the light emitter. For example, the second 417a set of one or more light-emitting elements illustrated in FIG. 4A includes first and second light-emitting elements configured and located on the die 410a such that the first and second light-emitting elements can be operated to provide light to respective first and third quarters of a range of angles of interest relative to the light emitter that includes the die 410a. Alternatively, a number of discrete light-emitting elements could be provided, as part of a single interconnected set of one or more light-emitting elements of a die of a light emitter, to provide light across a continuous range of angles relative to the light emitter.

Figure 4B:
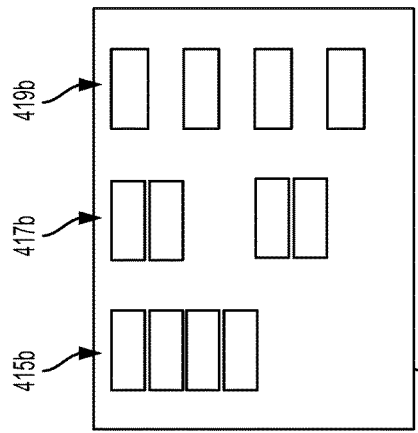
FIG. 4B illustrates an example die of a light emitter.

This is illustrated by way of example in FIG. 4B, which shows a die 410b that includes a plurality of light-emitting elements. The plurality of light-emitting elements of the die 410b includes first 415b, second 417b, and third 419b sets of one or more light-emitting elements that are each connected on the die 410b such that each of the first 415b, second 417b, and third 419b sets of light-emitting elements can be operated to produce a respective pattern of illumination, via an astigmatic optical element (not shown), from a light emitter that includes the die 410b. Each of the sets of one or more light-emitting elements 415a, 417a, 425a, 427a, when operated to generate light, produces a respective pattern of illumination such that illumination is provided to a respective one or more ranges of angles within a first range of angles in a first direction relative to the light emitter and such that illumination is provided across a second range of angles in a second direction that is substantially orthogonal to the first direction. Thus, the multiple discrete light-emitting elements of the first set of light-emitting elements are configured and located on the die 410b such that they provide light to a first half of a range of angles of interest relative to the light emitter that includes the die 410b.

Figure 4D:
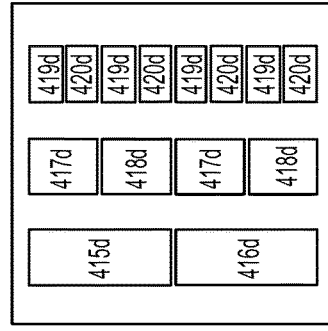
FIG. 4D illustrates an example die of a light emitter.
Figure 4A:
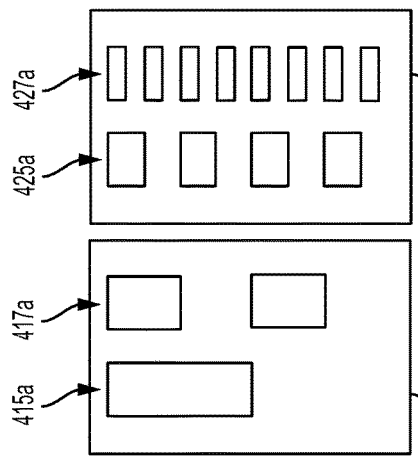
FIG. 4A illustrates first and second example dies of a light emitter.

As shown in FIGS. 1C, 4A, 4B, and elsewhere herein, the one or more light-emitting elements of a set of interconnected light-emitting elements of a die of a light emitter could be arranged in a column, with the location along the column of a particular light-emitting element corresponding to an angle or range of angles of illumination produced from the light emitter when the particular light-emitting element is operated to generate light. The location of all of the light-emitting elements of such a set along such a column could then correspond to a pattern of illumination produced from the light emitter when the set of light-emitting elements is operated to generate light. However, light-emitting elements of an interconnected set of one or more light-emitting elements could be arranged in some other manner across the surface of a die of a light emitter, e.g., in multiple columns or otherwise distributed across the die in order to increase an amount of light emitted from the light emitter and/or to reduce a temperature of the die when the die is operated to produce a pattern of illumination, e.g., by distributing the light-emitting elements of the die used to generate the pattern of illumination across a wider area of the die.

Figure 4C:
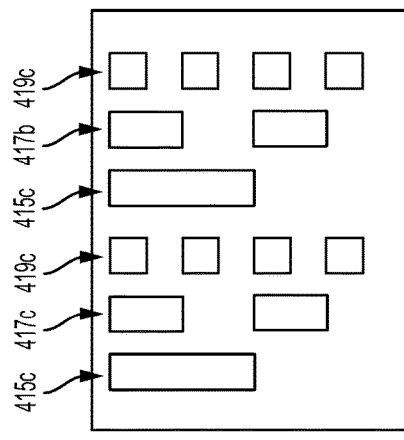
FIG. 4C illustrates an example die of a light emitter.

This is illustrated by way of example in FIG. 4C, which shows a die 410c that includes a plurality of light-emitting elements. The plurality of light-emitting elements of the die 410c includes first 415c, second 417c, and third 419c sets of one or more light-emitting elements that are each connected on the die 410c such that each of the first 415c, second 417c, and third 419c sets of light-emitting elements can be operated to produce a respective pattern of illumination, via an astigmatic optical element (not shown), from a light emitter that includes the die 410c. The light-emitting elements in each of the sets of one or more light-emitting elements 415c, 417c, 419c are distributed in two separate columns. Such a separation could be provided in order to reduce an average and/or peak temperature of the die 410c when the light-emitting elements are being operated to produce light by spreading the production of such waste heat over a wider area of the die 410c or according to some other consideration, e.g., to simplify routing of interconnects and/or terminals on the die 410c, to provide a configuration of light-emitting elements, interconnects, or other features that is compatible with a die fabrication process, or to increase the amount of light output from the light emitter.

A variety of different arrangements of light-emitting elements on a die, corresponding to a variety of different patterns of produced illumination, are anticipated by the inventors. Such patterns could provide patterns of illumination to the environment according to a binary partition of a range of angles of the environment, according to a gray code, or according to some other patterns. One of the produced patterns could provide illumination to all of a range of angles of interest, e.g., to provide timing information to objects in an environment, to optically signal some other information to objects in an environment, to facilitate determination of whether an object is location within a range of angles of interest that receives illumination from a light emitter, or to facilitate some other functionality.

In some examples, first and second different patterns of illumination (and corresponding interconnected sets of one or more light-emitting elements of a die) could provide illumination to substantially non-overlapping first and second ranges of angles. That is, angles that are illuminated by both the first and second patterns of illumination could be less than 5% of the total of the first range of angles and the second ranges of angles. In examples wherein the first range of angles and the second range of angles are substantially non-overlapping and, together, provide illumination to all of a range of angles of interest, the first and second patterns of illumination could be provided simultaneously in order to provide illumination to all of the range of angles of interest (e.g., to provide timing information, to optically signal some other information). Additionally or alternatively, such non-overlapping patterns of illumination could be provided during respective periods of time to control a mean detected intensity of illumination detected by objects in an environment, to control a bandwidth of the time-varying pattern of the intensity detected by objects in the environment, to provide sufficient changes in the detected intensity to recover a clock signal, or to provide for some other consideration.

This is illustrated by way of example in FIG. 4D, which shows a die 410d that includes a plurality of light-emitting elements. The plurality of light-emitting elements of the die 410d includes first 415d, second 416d, third 417d, fourth 418d, fifth 419d, and sixth 420d sets of one or more light-emitting elements that are each connected on the die 410d such that each of the sets of light-emitting elements 415d, 416d, 417d, 418d, 419d, 420d can be operated to produce a respective pattern of illumination, via an astigmatic optical element (not shown), from a light emitter that includes the die 410d. The sets of light-emitting elements 415d, 416d, 417d, 418d, 419d, 420d are configured to provide pairs of sets of light-emitting elements wherein each member of a pair of sets of light-emitting elements provides a pattern of illumination that is substantially non-overlapping with the other sets of the pair. Such a pair includes the first 415d and second 416d sets of one or more light-emitting elements of the die 410d, wherein the first set of one or more light-emitting elements 415d provides illumination to a first half of a range of angles of interest and the second set of one or more light-emitting elements 416d provides illumination to a second half of the range of angles of interest that is substantially non-overlapping with the first half of the range of angles of interest.

Other configurations of one or more dies of a light emitter and of interconnects, terminals, light-emitting elements, or other elements or features thereof are anticipated by the inventors. A die could include a number of sets of interconnected light-emitting elements (e.g., at least ten sets) such that the sets of light-emitting elements could be operated to produce respective different patterns of illumination to facilitate determination of the location of an object in an environment that receives the patterns of illumination. Such sets of one or more light-emitting elements could be interconnected with each other and/or with terminals of a die in a variety of ways. For example, each set of light-emitting elements could be connected to a respective pair of terminals of the die, or a number of sets could be connected in common to a single terminal (e.g., according to a common-cathode arrangement or a common-anode arrangement). Additionally or alternatively, pairs of sets of one or more light-emitting elements could share one or more terminals, being connected to such shared terminals according to an opposite polarity (that is, the anodes of the light-emitting element(s) of a first set could be connected to an in-common terminal while the cathodes of the light-emitting element(s) of a second set could be connected to the in-common terminal) such that each set of such a pair could be operated, during a respective period of time, to provide a respective pattern of illumination by providing voltage of a corresponding polarity to the in-common terminal(s). Other configurations of one or more dies of a light emitter, as described herein, are anticipated by the inventors.

IV. Example Electronics of a Light Emitter System

Figure 5:
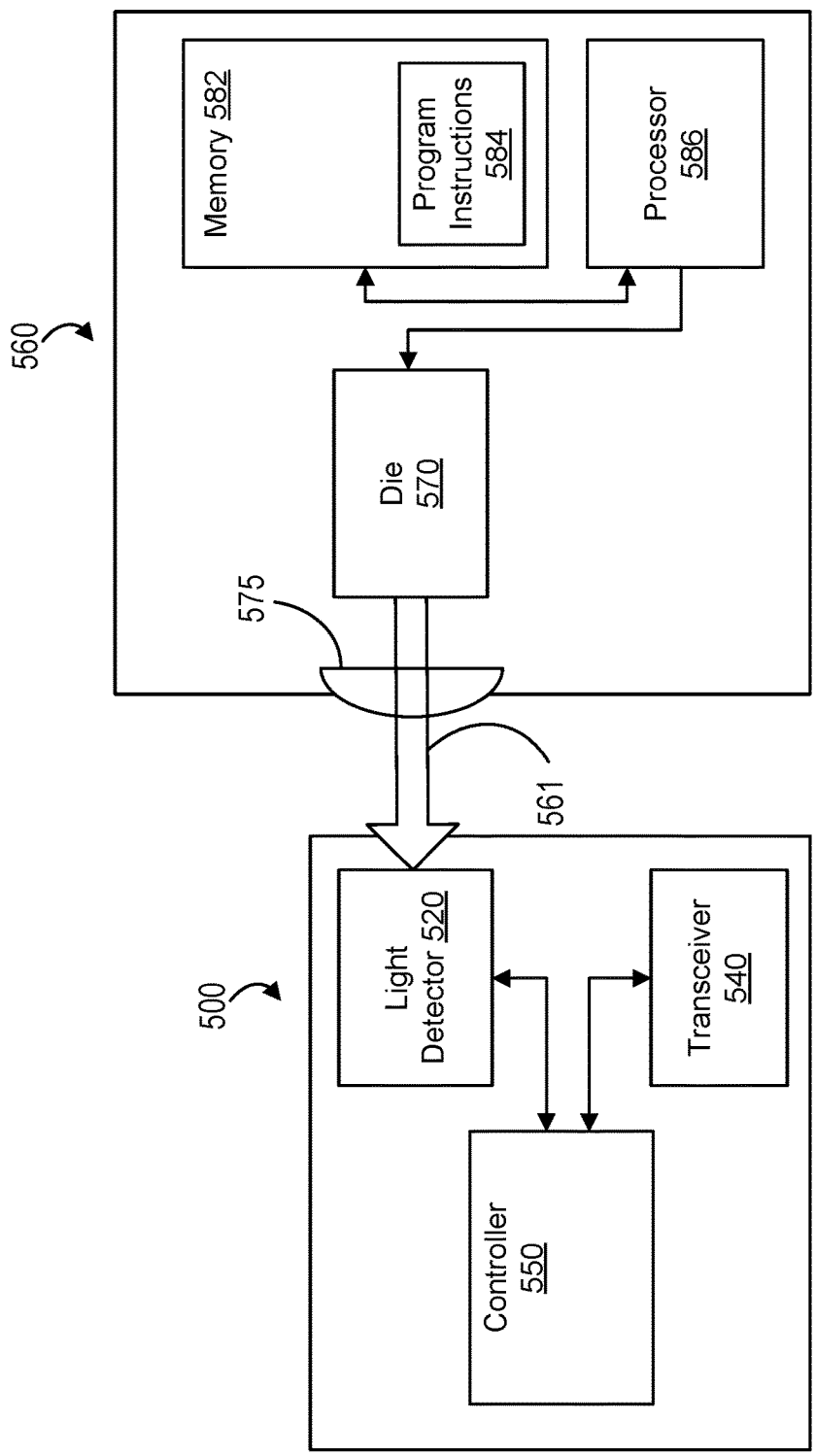
FIG. 5 is a block diagram of an example system that includes a light emitter and a light detector.

FIG. 5 is a block diagram of a system that includes a light emitter 560 that is configured to provide a plurality of different patterns of illumination as described elsewhere herein to an environment that includes an object 500. The object 500 includes a light detector 520 and a controller 550 configured to detect illumination 561 emitted from the light emitter 560. The object further includes a transceiver 540 configured to transmit and/or receive information to and/or from some other device (e.g., from the light emitter 560). The light detector 520 is configured to detect a property (e.g., an intensity) of light 561 received from the light emitter 560, e.g., light emitted as one or more patterns of illumination from the light emitter 560 during respective different periods of time. Such light can be detected and used to determine a location (e.g., an angle in a first direction relative to the light emitter 560) of the object 500. The light emitter 560 includes a die 570 that includes two or more sets of one or more light-emitting elements configured to provide light, via an astigmatic optical element 575, respective patterns of illumination to an environment that contains the object 500. The light emitter 560 further includes a processor 586 and a memory 582 configured to facilitate operation of the die 570 to produce such patterns of illumination.

The light emitter 560 is configured to produce, during respective periods of time, different patterns of illumination. Emitting each different pattern of illumination includes emitting illumination within a respective one or more ranges of angles of a first range of angles in a first direction relative to the device while emitting illumination across all of a second range of angles in a second direction relative to the device, the second direction being substantially orthogonal to the first direction. Thus, each pattern of illumination varies across the first direction such that an object (e.g., 500) can detect the intensity of light received from the light emitter 560 during such different periods of time and use the detected light intensities to determine the location of the object in an environment (e.g., to determine the angle of the object relative to the light emitter 560 in the first direction). The light emitter 560 producing a particular pattern of illumination includes generating light from a set of one or more interconnected light-emitting elements (e.g., LEDs, lasers, VCSELs) of the die 570.

The processor 586 of the light emitter 560 is configured to operate the die 570 (e.g., to apply voltages and/or currents to the different sets of one or more light-emitting elements of the die 570) to produce such different patterns of illumination from the light emitter 560. The processor 586 could include one or more microcontrollers, application-specific integrated circuits, field-programmable gate arrays, or other electronic components configured to operate the die 570 to produce different patterns of illumination during different periods of time. The processor 586 could include elements configured to performs such actions using program instructions 584 or other information contained within the memory 582, e.g., to generate a sequence of patterns of illumination according to a stored pseudo-random sequence or according to some other sequence, or to indicate some timing information or other information by emitting illumination 561 using the die 570. Alternatively, the light emitter 560 could include, instead of the processor 586 and memory 582, a number of flip-flops, timers, multiplexers, counters, or other circuits configured to operate the die 570 to produce patterns of illumination according to a sequence that is statically set by the structure of such circuits (e.g., to provide each of a set of patterns of illumination for a specified period of time in a repeating sequence).

The memory 582 can include program instructions 584 for execution by the processor 586 to cause the light emitter 560 to produce different patterns of illumination during respective different periods of time by emitting light from respective different sets of one or more light-emitting elements on the die 570 or to perform some other operations. In some examples, the program instructions 584 could include instructions to provide the different patterns of illumination according to a set sequence, e.g., such that each of the different patterns of illumination are presented repeatedly in turn. Alternatively, the program instructions 584 could include instructions to provide the different patterns of illumination according to a random or pseudorandom sequence. In yet another example, the program instructions 584 could include instructions to provide a subset of the different patterns of illumination. For example, if the location of an object is known to a low resolution (e.g., it is known that the object is located a second quarter of a range of angles of interest based on detecting light previously emitted from the light emitter 560), only a subset of different patterns of illumination could be provided to facilitate determination of the location of the object to a greater resolution and/or at a higher rate over time (e.g., by providing patterns of illumination that illuminate alternate eighths, sixteenths, or other partitions of a range of angles of interest at a finer resolution than the resolution of the known location of the object).

In a still further example, program instructions 584 could include instructions to provide illumination across a range of angles of interest to signal some information to objects in an environment, e.g., to indicate timing information about previous or subsequent patterns of illumination emitted from the light emitter 560, to provide information about the identity or other information about patterns of illumination emitted from the light emitter 560 and/or information about the order of production of such patterns (e.g., a seed value or other information about a pseudorandom sequence of patterns of illumination), or to provide some other information.

In some examples, the light emitter 560 could include a transceiver, a communications interface, a user interface, one or more further dies, or some other components, and the program instructions 584 could include instructions to operate such further components to provide some functionality. For example, the light emitter 560 could include a transceiver configured to communicate with the object 500 (e.g., via the transceiver 540 of the object 500). The program instructions 584 could include instructions to operate the transceiver to transmit timing information, information about patterns of illumination and/or a sequence of production of such patterns by the light emitter 560, or some other information to the object 500. Additionally or alternatively, the program instructions 584 could include instructions to operate the transceiver to receive location information determined by the controller 550 of the object 500 based on light intensities detected using the light detector 520, to transmit information about such detected intensities such that the processor 586 can determine the location of the object 500 based on such detected intensities, or to receive some other information from the object 500. The program instructions 584 could include instructions to operate such a transceiver to communicate with some other systems (e.g., to transmit information about a determined location of the object 500 to a phone, a computer, or some other system).

The light emitter 560 can be part of a smart phone, digital assistant, head-mounted display, controller for a robot or other system, or some other portable computing device. In such examples, the light emitted from the light emitter 560 (e.g., as different patterns of illumination) could be used to determine the location of objects (e.g., of objects including light detectors) relative to such other objects (e.g., the location of a user's hand, on which is disposed a light detector, relative to a user's head, on which a head-mounted display including the light emitter 560 is disposed). Alternatively, the light emitter 560 can be part of a system that is mounted to a floor, wall, ceiling, or other object or building such that the location of the light emitter 560 is relatively static relative to an environment of interest. In such examples, the light emitted from the light emitter 560 could be used to determine the location of objects (e.g., of objects including light detectors) relative to the environment (e.g., the location of segments of a person's body, on which are disposed a number of respective light detectors, to facilitate detection of motions of the person's body within the environment). Other configurations and/or applications of a light emitter as described herein are anticipated by the inventors.

The object 500 could be part of or disposed on a system (e.g., a drone), a tag or other device attached to an object or person of interest (e.g., to a body segment of a person, to facilitate motion capture), or configured in some other way to facilitate determination of the location of the object 500 based on a time-varying intensity of light received from the light emitter 560. This includes detecting such an intensity of light using the light detector 520 of the object 500. The light detector 520 could include a photodiode, a phototransistor, or some other element(s) that are sensitive to light emitted from the light emitter 560, e.g., to light at a wavelength corresponding to the wavelength of light emitted from light-emitting elements of the die 570 of the light emitter 560.

The controller 550 could include a variety of elements configured to operate the light detector 520 to detect the intensity or other properties of light received from the light emitter 560 and/or to perform some other operations. For example, the controller 550 could include logic gates, arithmetic logic units, microprocessors, registers, digital oscillators, counters, logical buses, amplifiers, analog-to-digital converters (ADCs), mixers, analog oscillators, buffers, or some other component or components. The controller could be configured to determine the location of the object 500 based on such detected illumination from the light emitter 560 and/or to transmit, using the transceiver 540, information about the detected illumination (e.g., about the intensity of the received illumination at a plurality of points in time, about the timing, sequence, or other information about a series of changes in the intensity of such received illumination over time) to some other system (e.g., the light emitter 560, a phone, a computer) that could then use the received information to determine the location of the object 500. The controller 550 could be configured to perform some other operations.

The controller 550 could include a variety of components used to detect illumination from the light emitter 560 that is received by the light detector 520. The light detector 520 could include a photodiode, a phototransistor, a photoresistive element, or some other components configured to output a voltage, a current, or some other electrical signal related to the intensity or other properties of the received light 561. The controller 550 could include amplifiers, transimpedance amplifiers, filters, buffers, voltage references, ADCs, or other components configured to operate the light detector 520 to detect the illumination 561 received from the light emitter 560. The controller could include further circuitry, e.g., clock recovery circuitry to determine relative timing information from transitions in the intensity of the detected illumination, asynchronous serial receiver circuitry to detect a sequence of changes in the intensity of the received illumination that are relative to the location of the object 500 and/or to information indicated by the light emitter 560, or to provide some other functionality.

The controller 550 could be configured to detect, using the light detector 520, illumination from multiple light detectors and/or from multiple different dies of a light detector. In some examples, the controller 550 could include digital or analog filters configured to facilitate detecting illumination received from multiple different light emitters and/or from multiple different dies of a light emitter by detecting components of the illumination received by the light detector 520 that vary at respective different frequencies corresponding to frequencies of modulation of the illumination emitted from such different dies and/or different light emitters. Additionally or alternatively, the light detector 520 could include multiple different light-sensitive elements (e.g., different photodiodes and/or optical filters coupled to such photodiodes) that are sensitive to illumination at respective different wavelengths corresponding to the wavelength of illumination produced by different light emitters and/or different dies of a light emitter to facilitate detection of illumination received from such multiple different light emitters and/or from multiple different dies of a light emitter.

It is noted that the block diagram shown in FIG. 5 is described in connection with functional modules for convenience in description. However, embodiments of the object 500 and/or light emitter 560 can be arranged with one or more of the functional modules ("sub-systems") implemented in a single integrated circuit (e.g., an integrated circuit that includes a light detector and circuitry for detecting an intensity of light received via the light detector), multiple integrated circuits or electronic assemblies (e.g., printed circuits boards with electronic components disposed thereon), or according to some other consideration.

Note that the illustrated components of the object 500 and light emitter 560 are intended as a non-limiting example embodiments and that light emitters configured to provide patterns of illumination to an environment, objects located in such an environment, and/or light detectors located in such an environment as described herein may include more or fewer of the illustrated elements and/or may include further elements. For example, an object that is located in an environment and that includes a light detector configured to detect light emitted from a light emitter may lack a controller or other elements configured to operate the light detector and/or to determine the location of the object. In such examples, the light emitter could be tethered via a cable to some other system (e.g., to the light emitter 560) that is configured to detect the light received via the light detector and to, based on such detected light, determine the location of the light detector. Further examples of light emitters, light detectors, tags and/or other objects or systems configured to produce patterns of illumination as describe herein and/or to detect such produced illumination are anticipated by the inventors.

V. Example Methods

Figure 6:
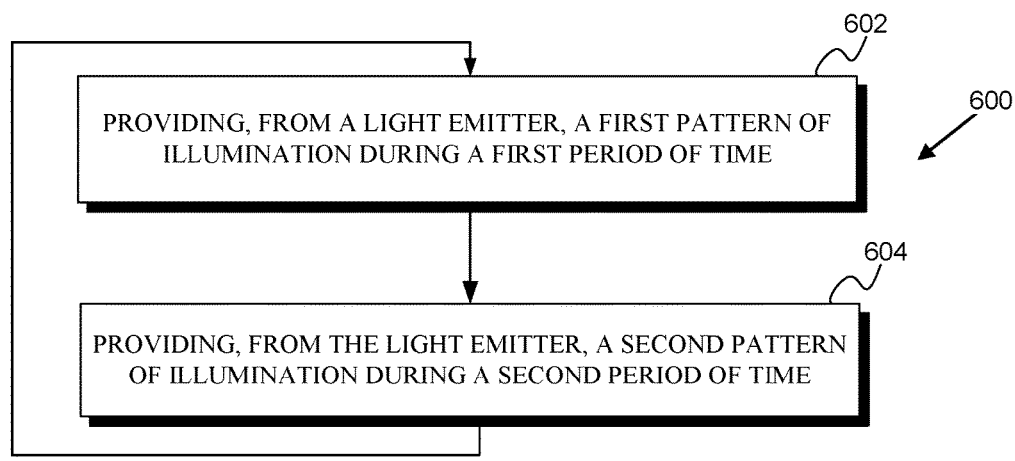
FIG. 6 is a flowchart of an example process.

FIG. 6 is a flowchart of a method 600 for operating a light emitter to produce patterns of illumination as described elsewhere herein. Such patterns of illumination can be provided, during respective periods of time, to facilitate determining the location of objects, in a first direction relative to the light emitter, based on illumination received by the objects over time from the light emitter. The patterns of illumination are specified to spatially encode the environment of the light emitter such that different regions of the environment (e.g., different ranges of angles in the first direction, relative to the light emitter) receive different time-varying patterns of illumination from the light emitter. Such a time-varying pattern can be detected and used to determine which of the regions of the environment the time-varying pattern was detected from, and thus to determine the location (e.g., the angle in the first direction) of a light detector or other apparatus used to detect the time-varying pattern with respect to the light emitter.

The light emitter includes a number of sets of one or more interconnected light-emitting elements that are disposed on a die of the light emitter and that each correspond to a respective one of the patterns of illumination emitted from the light emitter. The die is disposed relative to an astigmatic optical element of the light emitter such that, when a particular set of one or more interconnected light-emitting elements of the die is operated to generate light, the generated light interacts with the astigmatic optical element to produce a corresponding one of the patterns of illumination from the light emitter.

The method 600 includes providing, from a light emitter, a first pattern of illumination during a first period of time (602). Providing the first pattern of illumination includes providing illumination from the light emitter within a first subset of a first range of angles in a first direction relative to the light emitter and providing illumination from the light emitter across all of a second range of angles in a second direction relative to the light emitter, the second direction being substantially orthogonal to the first direction. The first subset of the first range of angles could include approximately half (e.g., between 45% and 55%) of the first range of angles. Providing the first pattern of illumination includes operating a first set of one or more light-emitting elements of the die of the light emitter to generate light that is presented to the environment, via the astigmatic optical element, as the first pattern of illumination. The first subset of angles could be related to the location, size, geometry, emission profile, or other properties of the light-emitting element(s) of the first set of one or more light-emitting elements on the die.

The method 600 further includes providing, from the light emitter, a second pattern of illumination during a second period of time (604). Providing the second pattern of illumination includes providing illumination from the light emitter within a second subset of the first range of angles and providing illumination from the light emitter across all of the second range of angles. The second subset of the first range of angles could include approximately half (e.g., between 45% and 55%) of the first range of angles. Providing the second pattern of illumination includes operating a second set of one or more light-emitting elements of the die of the light emitter to generate light that is presented to the environment, via the astigmatic optical element, as the second pattern of illumination. The second subset of angles could be related to the location, size, geometry, emission profile, or other properties of the light-emitting element(s) of the second set of one or more light-emitting elements on the die.

Subsequent to providing the second pattern of illumination (604), the steps of the method 600 repeat, providing the first and second patterns of illumination repeatedly during respective alternating repeated periods of time. A light detector located in the environment of the light emitter could detect an intensity of received illumination during such repeated periods of time and such detected intensities could be used to determine the location of the light detector in the first direction relative to the light emitter. The method 600 could include further steps, wherein further patterns of illumination are generated, during respective periods of time, from the light emitter by generating light from respective further sets of one or more interconnected light-emitting elements on the die. Such further patterns of illumination could be provided to increase a resolution to which the location of a light detector or other object in the environment can be determined, e.g., by providing patterns of illumination that provide illumination selectively to smaller portions of the environment.

The method 600 could include additional steps. The method 600 could include a step providing illumination, during a particular one or more periods of time, to all of the first range of angles, e.g., to provide synchronization or timing information to light detectors or other objects receiving such illumination. The method 600 could include providing, via one or more provided patterns of illumination, optical transmissions of information to light detectors in the environment. The method 600 could include providing, via radio frequency transmissions, information about the timing, sequence, angles of an environment illuminated, or other information about patterns of illumination provided, during respective different periods of time, from the light emitter. The method 600 could include further steps, or steps alternative to those listed here.

VI. Conclusion

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:
a die, wherein the die comprises a plurality of light emitting elements that are connected on the die to form a first set of one or more light emitting elements and a second set of two or more light emitting elements; and
an astigmatic optical element, wherein the die is disposed relative to the astigmatic optical element such that the astigmatic optical element projects light emitted from the first and second sets of light emitting elements to produce respective different patterns of illumination from the device within respective ranges of angles of a first range of angles in a first direction relative to the device, and further such that the astigmatic optical element projects light emitted from both of the first and second sets of light emitting elements across all of a second range of angles in a second direction relative to the device, the second direction substantially orthogonal to the first direction, wherein each light emitting element of the second set of two or more light emitting elements emits illumination from the device, via the astigmatic optical element, across a respective range of angles within the first range of angles, and wherein each light emitting element of the second set of two or more light emitting elements emits illumination from the device, via the astigmatic optical element, across the second range of angles.

2. The device of claim 1, wherein the astigmatic optical element is coupled to the die with an adhesive.

3. The device of claim 1, wherein the astigmatic optical element comprises a refractive or reflective optical element having an aspheric cylindrical surface.

4. The device of claim 1, further comprising:
a second die, wherein the second die comprises a second plurality of light emitting elements that are connected on the second die to form a third set of one or more light emitting elements and a fourth set of two or more light emitting elements, wherein the second die is disposed relative to the astigmatic optical element such that the astigmatic optical element projects light emitted from the third and fourth sets of light emitting elements to produce respective different patterns of illumination from the device within respective ranges of angles within the first range of angles, and further such that the astigmatic optical element projects light emitted from both of the third and fourth sets of light emitting elements across all of the second range of angles.

5. The device of claim 1, wherein the patterns of illumination emitted from the device illuminate respective ranges of angles within the first range of angles such that each pattern provides illumination to approximately half of the first range of angles.

6. The device of claim 5, wherein illumination emitted from the first set of one or more light emitting elements of the die illuminates a first range of angles, wherein illumination emitted from the second set of two or more light emitting elements of the die illuminates a second range of angles, and wherein the first range of angles and the second range of angles are substantially non-overlapping.

7. The device of claim 1, wherein the plurality of light emitting elements are connected on the die to form at least eight further sets of two or more light emitting elements, wherein the light emitting elements of the at least eight further sets of two or more light emitting elements are disposed on the die relative to the astigmatic optical element such that the astigmatic optical element projects light emitted from the at least eight further sets of two or more light emitting elements to produce respective different patterns of illumination from the device within the first range of angles, wherein the patterns of illumination emitted from the device due to emission of light from the at least eight further sets of two or more light emitting elements through the astigmatic optical element illuminate respective ranges of angles within the first range of angles, and wherein the patterns of illumination emitted from the device due to emission of light from the at least eight further sets of two or more light emitting elements through the astigmatic optical element illuminate all of the second range of angles.

8. The device of claim 1, wherein the first range of angles spans at least 60 degrees.

9. The device of claim 1, wherein the die further comprises a third set of one or more light emitting elements, wherein the die is disposed relative to the astigmatic optical element such that the astigmatic optical element projects light emitted from the third set of one or more light emitting elements to across all of the first range of angles.

10. A system comprising:
a light emitter, wherein the light emitter comprises:
a die, wherein the die comprises a plurality of light emitting elements that are connected on the die to form a first set of one or more light emitting elements and a second set of two or more light emitting elements; and
an astigmatic optical element, wherein the die is disposed relative to the astigmatic optical element such that the astigmatic optical element projects light emitted from the first and second sets of light emitting elements to produce respective different patterns of illumination from the light emitter within respective ranges of angles of a first range of angles in a first direction relative to the light emitter, and further such that the astigmatic optical element projects light emitted from both of the first and second sets of light emitting elements across all of a second range of angles in a second direction relative to the light emitter, the second direction substantially orthogonal to the first direction, wherein each light emitting element of the second set of two or more light emitting elements emits illumination from the device, via the astigmatic optical element, across a respective range of angles within the first range of angles, and wherein each light emitting element of the second set of two or more light emitting elements emits illumination from the device, via the astigmatic optical element, across the second range of angles; and a light detector, wherein the light detector is operable to detect illumination emitted from the light emitter.

11. The system of claim 10, wherein the astigmatic optical element comprises a refractive or reflective optical element having an aspheric cylindrical surface.

12. The system of claim 10, wherein the plurality of light emitting elements are connected on the die to form at least eight further sets of two or more light emitting elements, wherein the light emitting elements of the at least eight further sets of two or more light emitting elements are disposed on the die relative to the astigmatic optical element such that the astigmatic optical element projects light emitted from the at least eight further sets of two or more light emitting elements to produce respective different patterns of illumination from the light emitter within respective ranges of angles within the first range of angles, and wherein each pattern of illumination emitted from the light emitter due to emission of light from the at least eight further sets of two or more light emitting elements through the astigmatic optical element illuminates all of the second range of angles.

13. The system of claim 10, further comprising at least one controller, wherein the at least one controller is operable to perform operations comprising:
producing, using the light emitter, different patterns of illumination during different periods of time by applying power, via interconnects of the die, to one of the first set of one or more light emitting elements or the second set of two or more light emitting elements during the different periods of time;
detecting, using the light detector, illumination that is emitted from the light emitter; and
determining, based on the illumination detected by the light detector, a location of the light detector relative to the light emitter.

14. The system of claim 13, further comprising a further light emitter, wherein the further light emitter comprises:
a second die, wherein the second die comprises a second plurality of light emitting elements that are connected on the second die to form a third set of one or more light emitting elements and a fourth set of two or more light emitting elements; and
a second astigmatic optical element, wherein the second die is disposed relative to the second astigmatic optical element such that the second astigmatic optical element projects light emitted from the third and fourth sets of light emitting elements to produce respective different patterns of illumination from the second light emitter within respective ranges of angles within a third range of angles in a third direction relative to the second light emitter, and further such that the second astigmatic optical element projects light emitted from both of the third and fourth sets of light emitting elements across all of a fourth range of angles in a fourth direction relative to the second light emitter, the fourth direction substantially orthogonal to the third direction; and
wherein the operations further comprise:
producing, using the further light emitter, different patterns of illumination during different periods of time by applying power, via interconnects of the further die, to one of the third set of one or more light emitting elements or the fourth set of two or more light emitting elements during the different periods of time;
detecting, using the light detector, further illumination that is emitted from the further light emitter; and
determining, based on the further illumination detected by the light detector, a location of the light detector relative to the further light emitter.

15. A method comprising:
providing, from a light emitter, a plurality of different patterns of illumination during respective periods of time, wherein providing each pattern of illumination comprises providing illumination from the light emitter within respective ranges of angles within a first range of angles in a first direction relative to the light emitter, and wherein each provided pattern of illumination illuminates all of a second range of angles in a second direction relative to the light emitter, the second direction substantially orthogonal to the first direction, and wherein the light emitter comprises:
a die, wherein the die comprises a plurality of light emitting elements that are connected on the die to form a first set of one or more light emitting elements and a second set of two or more light emitting elements; and
an astigmatic optical element, wherein the die is disposed relative to the astigmatic optical element such that the astigmatic optical element projects light emitted from each set of light emitting elements to produce a respective one of the plurality of different patterns of illumination from the light emitter, wherein producing a particular pattern of illumination during a period of time comprises applying power, via interconnects of the die, to one of the sets of light emitting elements, wherein each light emitting element of the second set of two or more light emitting elements emits illumination from the device, via the astigmatic optical element, across a respective range of angles within the first range of angles, and wherein each light emitting element of the second set of two or more light emitting elements emits illumination from the device, via the astigmatic optical element, across the second range of angles.

16. The method of claim 15, wherein the astigmatic optical element comprises a refractive or reflective optical element having an aspheric cylindrical surface.

17. The method of claim 15, wherein each of the different patterns of illumination illuminate a respective range of angles within the first range of angles such that each pattern provides illumination to approximately half of the first range of angles.

18. The method of claim 15, wherein the plurality of light emitting elements are connected on the die to form at least ten sets of two or more light emitting elements.

19. The method of claim 15, further comprising:
detecting, using a light detector, illumination that is emitted from the light emitter; and
determining, based on the illumination detected by the light detector, a location of the light detector relative to the light emitter.

20. The method of claim 15, further comprising:
providing, from a second light emitter, a second plurality of different patterns of illumination during respective periods of time, wherein providing each pattern of illumination of the second plurality of patterns of illumination comprises providing illumination from the second light emitter within respective ranges of angles within a third range of angles in a third direction relative to the second light emitter, and wherein each provided pattern of illumination of the second plurality of patterns of illumination illuminates all of a fourth range of angles in a fourth direction relative to the second light emitter, the fourth direction substantially orthogonal to the third direction, and wherein the second light emitter comprises:

a second die, wherein the second die comprises a second plurality of light emitting elements that are connected on the second die to form at least two sets or two or more light emitting elements; and a second astigmatic optical element, wherein the second die is disposed relative to the second astigmatic optical element such that the second astigmatic optical element projects light emitted from each set of two or more light emitting elements of the second die to produce a respective one of the second plurality of different patterns of illumination from the second light emitter, and wherein producing a particular pattern of illumination from the second light emitter during a period of time comprises applying power, via interconnects of the second die, to one of the sets of two or more light emitting elements of the second die.

\* \* \* \* \*